United States Patent [19]

Blier et al.

[11] Patent Number: 5,384,751
[45] Date of Patent: Jan. 24, 1995

[54] ATTACHMENT DEVICE FOR TETHERED TRANSDUCER

[75] Inventors: Darren J. Blier, Westerly, R.I.; Eric J. Jensen, New London, Conn.

[73] Assignee: The United States of America as represented by the Secretary of the Navy, Washington, D.C.

[21] Appl. No.: 269,316

[22] Filed: Jun. 30, 1994

[51] Int. Cl.⁶ .................................. G01V 1/38
[52] U.S. Cl. .............................. 367/15; 367/20; 367/154; 367/173; 114/244
[58] Field of Search ............ 367/16, 15, 20, 154, 367/173; 114/242, 244, 253

[56] References Cited

U.S. PATENT DOCUMENTS

| | | | |
|---|---|---|---|
| 4,879,719 | 11/1989 | Dumestre, III | 367/20 |
| 4,884,249 | 11/1989 | Snook | 367/154 |
| 5,144,588 | 9/1992 | Johnston et al. | 367/16 |
| 5,164,922 | 10/1992 | Cappelen et al. | 367/144 |
| 5,214,612 | 5/1993 | Olivier et al. | 367/16 |
| 5,341,348 | 8/1994 | Farris | 367/154 |

*Primary Examiner*—J. Woodrow Eldred
*Attorney, Agent, or Firm*—Michael J. McGowan; Prithvi C. Lall; James M. Kasischke

[57] ABSTRACT

A submerged cable is fitted with one or more tethered transducers that are rotatably supported on the cable between clamped collars spaced apart to receive a standoff device. The device has pivotably connected flat portions which define semi-circular lower parts to so receive the cable. Upper triangular panel portions can be spread apart to receive the cable, and clamped together by a clevis that is connected to a riser or tether for the transducer.

6 Claims, 3 Drawing Sheets

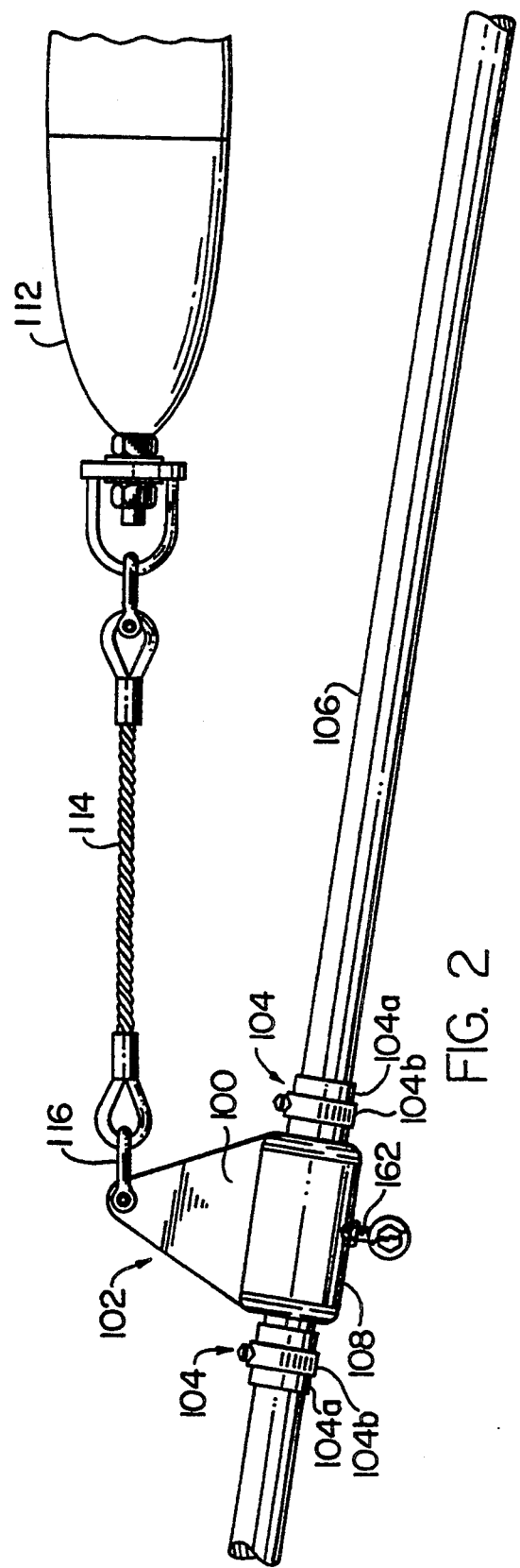

ATTACHMENT DEVICE FOR TETHERED TRANSDUCER

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

This invention relates generally to the deployment of underwater cable and the attachment of tethered transducer to such cable as the cable is being deployed.

(2) Description of the Prior Art

As used herein, the term "transducer" includes hydrophones, pingers and other electroacoustic devices.

One characteristic of oceanographic communication via underwater cable is that the cable tends to twist and move causing the tethered transducer or electroacoustic transducer riser cable to become twisted around the trunk or tow cable. Various devices have been employed to reduce this propensity for the riser cable of the transducer being ensnared by the trunk or tow cable, including swivel connectors of the type sometimes used with chains and hoses or the like. See for example prior art U.S. Pat. No. 2,519,460 wherein a swivel is provided between lengths of chain. Such a device suffers from the disadvantage that it cannot be applied to a continuous trunk or tow cable being deployed at sea. U.S. Pat. No. 3,107,110 illustrates a swivel suitable for use with a continuous hose. However, this prior art swivel device suffers from the disadvantage that it must be clamped to the elongated hose or pipe. As a result of such cable construction being made up of wire strands wrapped in a helical fashion inside the outer cable covering the cable tends to twist and turn. Furthermore tension loads in the cable tend to reduce the outer diameter of the cable cover with the result that such prior art swivel devices tend to slip along the cable in the underwater environment. Deployment constraints also prevent the adaptation of prior art solutions to gripping such cable, and the present invention seeks to provide a solution to these problems that not only avoids these cable construction constraints, but which also provides a conveniently attachable means for securing the tethered transducers to selected points along the cable while the cable is being deployed at sea.

SUMMARY OF THE INVENTION

An object of the present invention is to provide a device for attaching a transducer to an underwater cable so that the tether line or riser will not foul on the underwater cable to which it is tethered by reason of movement of the cable including twisting movement thereof.

Another object of the present invention is to provide a device for attaching a tethered transducer to an underwater cable such that the transducer and its tether will always assume a position at an angle to the cable so that the tethered transducer does not come into contact with the underwater cable.

Still another object of the present invention is to provide a device for attaching a tethered transducer to an underwater cable in such a manner that the cable can be conveniently deployed at sea without the inconvenience of installing elaborate coupling or swiveling devices to the underwater cable as it is being deployed.

In accordance with the invention, a device is provided for mechanically connecting a tethered transducer to an underwater cable by a device that includes two spaced collars clamped to the underwater cable so as to provide a space therebetween. A standoff is provided with flag portions, connected to one another at inner ends, and which flag portions define a V-shape so as to receive the segment of the underwater cable between the collars. These flag portions are then closed against one another to provide the cable in a recess defined by segments of these flag portions that fit between these collars. When these flag portions are closed against one another the ends opposite the connected ends define the apex of a triangle where the tethered transducer riser can be conveniently connected.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein:

FIG. 2 is an elevational view of an attachment device as used in accordance with the teachings of the present invention;

DESCRIPTION OF THE PREFERRED EMBODIMENT

Figure 1:
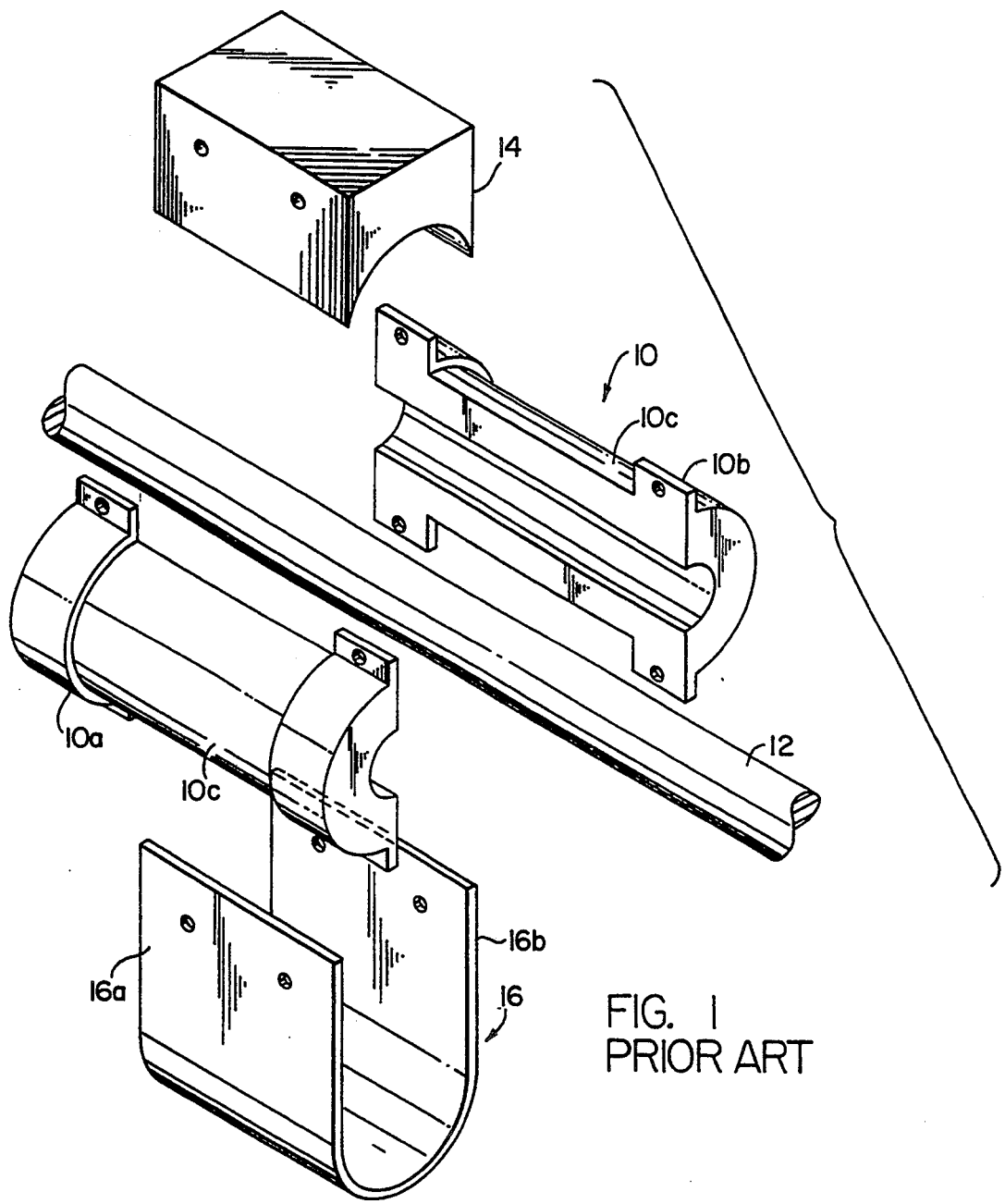
FIG. 1 is an exploded view of a prior art transducer attachment device.

Referring to FIG. 1, a prior art attachment device is shown wherein a split collar assembly 10 comprising two halves 10a and 10b, that define a cavity for receiving the cable. This split collar is clamped to the cable by screws not shown. The split collar 10 when so assembled with the cable 12 defines a region 10c that is adapted to receive a U-shaped steel bale 16 with its legs 16a and 16b adapted to surround the central portion 10c of the collar and to be rotatable with respect thereto. A spacer block 14 is adapted to be received between the legs 16a and 16b of the bale 16 and is adapted to be secured thereto by a screw or other component (not shown) that is in turn connected to the tethered cable or riser associated with a transducer or other electroacoustic transducer. Such a prior art device can be difficult to install in the field. In order to install such a device the collar half sections 10a, 10b must first be positioned around the cable 12 at the desired location, and then bolted in place by means of four bolts. The U-shaped bale 16 and spacer 14 are then assembled on the collar's reduced cross sectional region 10c and bolted in place.

Finally the transducer riser or tether is secured to the resulting assembly. This process is time consuming and requires a large number of parts. Furthermore, when the cable stretches, its outer diameter is reduced, and in the underwater environment quite slippery. Therefore, this prior art attachment device has been found to slide along the cable with the result that the tethered transducer can become mispositioned and can actually cause damage to the cable jacket ultimately leading to cable failure.

The present invention avoids these disadvantages in a rotating standoff for a tethered transducer that will not slide along the cable, and which is relatively easy to install at sea.

Referring now to FIG. 2, there is shown a standoff 102 of the current invention positioned between two cable locking collars 104 on a cable 106. The cable 106 can be similar to that described previously with reference to the cable 12 of the prior art attachment device illustrated in FIG. 1. Cable 106 is adapted to be deployed from a moving vessel, and any number of transducers or other electroacoustic devices 112 are applied to the cable at predetermined locations for purposes of identifying a trunk cable position after cable 106 has been so deployed or for use in a trailing array in the case of a towed cable. In accordance with the present invention the cable 106 of FIG. 2 is fitted with pairs of closely spaced identical stop collars 104. Stop collar 104 shown herein comprises an elastomeric compression member 104a affixed about cable 106 by a hose clamp 104b. Other conventional collars 104 can be used for this purpose so as to provide a known space or displacement between the collars 104 in order to receive standoff 102. Standoff 102 has a flag portion 100 and a cable engaging portion 108. Transducer 112 is joined to standoff 102 by a tether 114 which is affixed to a clevis 116 disposed at the extremity of flag portion 100. Further details of standoff 102 are shown in FIGS. 3A, 3B and 3C.

Figure 3C:
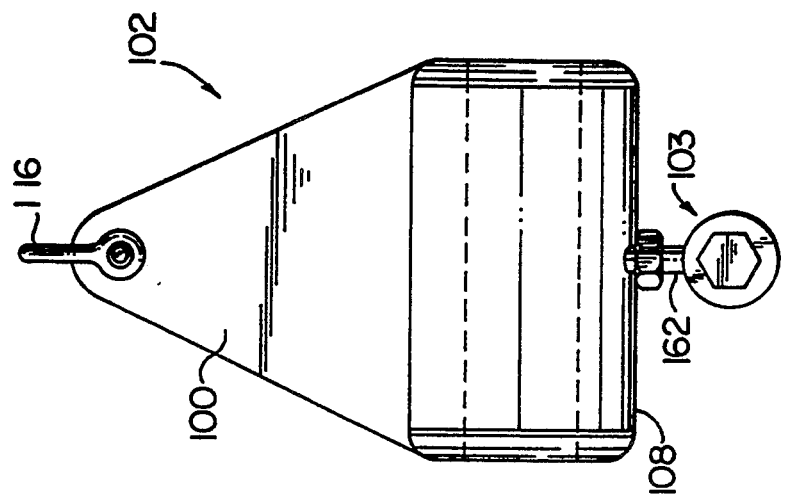
FIG. 3C is a side view of the attachment device as illustrated in FIG. 3B.
Figure 3B:
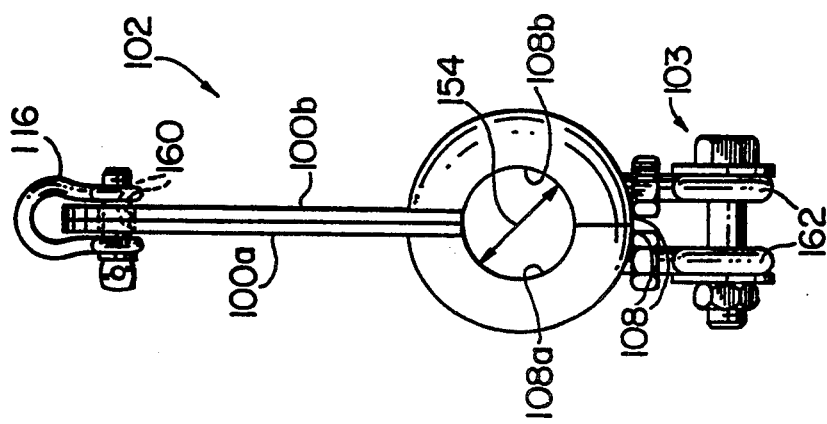
FIG. 3B is an end view of the attachment device of FIG. 2 in its closed condition for surrounding a cable in accordance with the present invention.
Figure 3A:
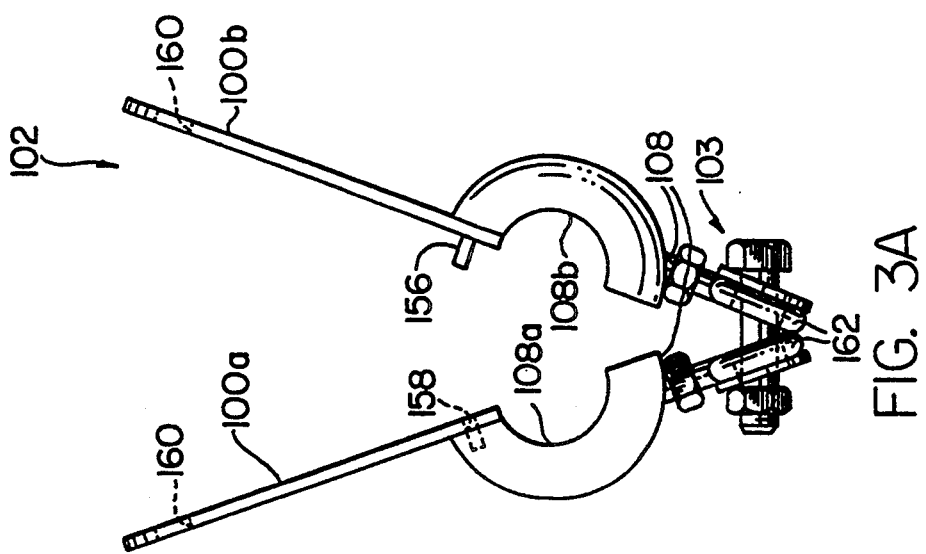
FIG. 3A is an end view of the attachment device of FIG. 2 prior to assembly with a cable.

The standoff 102 will normally be preassembled in the configuration shown in FIG. 3A where the standoff has flag portions 100a and 100b oriented in a V-shape and connected at adjacent end portions or lower parts by a conventional bolt or other fastener as indicated generally at 103. Each flag portion 100a, 100b defines an eye-bolt 162 at its lower end 108 for receiving the bolt 103 as shown in FIGS. 3A, 3B and 3C. Finally, if desired, a locating or alignment pin 156 can be provided in one side of a flag portion 100b in the event that excessive play is caused by the eye-bolt/bolt 103 connection between the flag portion ends. A hole 158 to receive the alignment pin 156 is preferably provided in the other flag portion 100a to assure alignment between these flag portions 100 upon assembly around the cable as shown in FIG. 3B. As so constructed and arranged the flag portions 100a, 100b can be placed in the V-shape shown in FIG. 3A for readily receiving the cable segment referred to previously between the stop collars 104. Inner semi-circular cable engaging parts 108a and 108b are defined in the standoff outer panels of flag portions 100a and 100b. Once the cable (not shown) has been provided between the lower cable engaging parts 108a and 108b, flag portions 100a and 100b can be closed one against the other as shown in FIG. 3B. The cable in FIGS. 3A, 3B and 3C has a diameter less than the dimension 154 and is loosely received in these cable engaging parts 108a and 108b allowing the standoff 102 to rotate freely on the cable 106 when provided in the position shown for it in FIG. 2.

A clevis 116 is provided in a single opening defined for this purpose at the apex of the upper triangular part of the flag portions and as indicated generally at 160 in FIG. 3A. This clevis 116 is used to provide a convenient attachment point for the tether line 114 as best shown in FIG. 2. Tether line 114 serves to provide transducer 112 in known relationship to the cable 106. As the cable 106 moves under the sea or rotates the transducer will nevertheless be tethered to it so as to always assume a position relative to the cable 106 that will avoid any tendency to slide along the cable or to twist around the cable.

FIG. 3C shows the standoff provided in the same position illustrated for it in FIG. 3B, that is in position for rotatably receiving the cable. The combined thickness of both flag portions 100 in the region of the triangular panels is much less than the dimension 154 and hence of the cable diameter.

From the foregoing one skilled in the art can easily ascertain the essential characteristics of this invention and without departing from the spirit and scope thereof, can make various changes and modifications of the invention to adapt to various useages and conditions. As an example, the standoff of FIGS. 3A, 3B and 3C could be fabricated of a single molded plastic component to have a normal V-shaped configuration such as that shown for it in FIG. 3A, and to have an integrally defined self defined hinged joint in place of the bolt/eye-bolt connection described above. While the cable engaging segments 108a and 108b are now fabricated from a plastic insert material bonded to the metal flag portions, it will be apparent that the use of an appropriate plastic for the V-shaped integral design could be chosen to avoid the necessity for bonding an appropriate plastic to the metal standoff shown in FIG. 3A. In the version shown in FIGS. 3A, 3B and 3C the actual metal selected for the various components may vary. Such a material may comprise aluminum, stainless steel, and/or synthetic composite materials suitable for withstanding the environmental conditions and corrosive effects resulting from immersion in salt water. The collars 104 illustrated in FIG. 2 need not being described in detail, and may comprise worm gear hose clamps in combination with a split rubber bushing. A single screw adapted for securely clamping such a collar to the cable will afford suitable strength in the axial direction to prevent sliding of the collar on the cable.

Finally, the cable 106 may be adapted to be towed from a vehicle with the result that the forces imposed upon the tethered transducer 112 may be more severe than the trunk cable situation where the cable is submerged in salt water in undisturbed condition for a period of time. The advantages of the present invention are equally applicable to both the towed and trunk cable configurations. FIG. 2 illustrates a towed cable configuration wherein a plurality of pingers 112 are secured to a cable 106 in longitudinally spaced predetermined positions. In such a situation the towed cable 106 can be retrieved, and each pinger 112 in turn removed from the cable by simply opening the standoff and leaving in place the locking collars 104. Again, the necessity for assembling a plurality of parts is avoided and only the single clevis securing the tether to the outer end of the standoff need be disassembled.

In light of the above, it is therefore understood that within the scope of the appended claims, the invention may be practiced otherwise than as specifically described.

What is claimed is:

1. A device for tethering a transducer to a cable, said device comprising:
   stop collars adapted to be secured to the cable at spaced locations, said collars defining a segment of the cable therebetween;

a standoff having flag portions with lower parts connected to one another, said flag portions normally spaced apart so as to receive said cable segment between said stop collars, said standoff flag portions including upper parts;

said standoff also having cable engaging segments adjacent said connected lower parts for mating with the cable segment between said collars and for loosely receiving the cable, said cable engaging segments having a length substantially equal to or slightly less than the spacing provided between said cable clamping collars on said cable; and a fastening means disposed on said flag portion upper parts for securing said transducer to said standoff.

2. The combination according to claim 1 wherein said spaced apart flag portions normally assume a V-shape to so receive said cable segment and said upper parts defining panels, said panels abutting one another when said standoff is secured to said transducer.

3. The combination according to claim 2 wherein said flag portion panels are generally triangular in configuration with one apex of the triangle defining at least in part said fastening means for so securing a transducer.

4. The combination according to claim 3 wherein said combination is further characterized by a plurality of such transducer attachment devices each of which has a transducer tethered thereto.

5. The combination according to claim 4 wherein each attachment device for so tethering transducers to the cable comprises paired stop collars associated with each attachment device and spaced from one another as aforesaid.

6. The combination according to claim 2 wherein each attachment device for so tethering transducers to the cable comprises paired stop collars associated with each attachment device and spaced from one another as aforesaid.

* * * * *